(12) United States Patent
Kersting et al.

(10) Patent No.: US 9,460,206 B2
(45) Date of Patent: Oct. 4, 2016

(54) ACTIVE PLATFORM SYSTEM

(76) Inventors: Björn Kersting, Braunfels (DE); Ernst A. Bender, Biberach (DE)

( * ) Notice: Subject to any disclaimer, the term of this patent is extended or adjusted under 35 U.S.C. 154(b) by 377 days.

(21) Appl. No.: 14/241,905

(22) PCT Filed: Aug. 29, 2012

(86) PCT No.: PCT/DE2012/100254
§ 371 (c)(1),
(2), (4) Date: Aug. 15, 2014

(87) PCT Pub. No.: WO2013/029605
PCT Pub. Date: Mar. 7, 2013

(65) Prior Publication Data
US 2014/0365457 A1    Dec. 11, 2014

Related U.S. Application Data

(60) Provisional application No. 61/564,460, filed on Nov. 29, 2011.

(30) Foreign Application Priority Data

Aug. 29, 2011 (DE) .......................... 10 2011 111 381

(51) Int. Cl.
| | | |
|---|---|---|
| *G06F 17/00* | (2006.01) | |
| *G06F 17/30* | (2006.01) | |
| *G06Q 10/10* | (2012.01) | |
| *H04L 29/06* | (2006.01) | |
| *G06F 17/24* | (2006.01) | |

(52) U.S. Cl.
CPC ......... *G06F 17/30861* (2013.01); *G06F 17/24* (2013.01); *G06F 17/30867* (2013.01); *G06Q 10/103* (2013.01); *H04L 65/403* (2013.01)

(58) Field of Classification Search
CPC ............ G06F 17/24; G06F 17/30861; G06F 17/30867; G06Q 10/103
See application file for complete search history.

*Primary Examiner* — Truong Vo
(74) *Attorney, Agent, or Firm* — Bachman & LaPointe, P.C.

(57) ABSTRACT

In the case of a web-based platform apparatus for collecting and editing information, which platform apparatus can be networked to a plurality of subscribers that can be identified by means of an identifier, wherein the information on the platform is formed by a plurality of dual units (DuUs), wherein a dual unit (DuU) respectively comprises a memory location, associated with a prescribeable content and provided with an identifier, and also a prescribeable criterion, associated with the memory location and in the form of an information filter, for input of a piece of information into the memory location, strategic interchange of the contents of dual units by a plurality of suitable subscribers is rendered possible in that the content of at least one dual unit (DuU) (104) from a plurality of dual units (101 to 109) of a subscriber A is transmitted to a subscriber B in automated fashion by means of an active feed (DuU-feed) (140), and at the same time the content of at least one dual unit (DuU) (112, 113) from a plurality of dual units (111 to 121) of a subscriber B is transmitted to a subscriber A in automated fashion by means of an active feed (DuU-feed) (130), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A.

18 Claims, 3 Drawing Sheets

ACTIVE PLATFORM SYSTEM

CROSS-REFERENCE TO RELATED APPLICATION

The present patent application is based on and claims the benefit of U.S. Patent Application Ser. No. 61/564,460, which was filed on Nov. 29, 2011 and has the title "Platform System".

BACKGROUND OF THE INVENTION

The invention relates to a web-based platform apparatus for collecting and editing information, which platform apparatus can be networked to a plurality of subscribers that can be identified by means of an identifier, wherein the information on the platform is formed by a plurality of dual units (DuUs), wherein a dual unit (DuU) respectively comprises a memory location, associated with a prescribeable content and provided with an identifier, and also a prescribeable criterion, associated with the memory location and in the form of an information filter, for input of a piece of information into the memory location.

Platform apparatuses of the type cited at the outset are known in the prior art for a large number of applications. Inter alia, they are also operated on the worldwide Internet. However, the known platform apparatuses firstly have the disadvantage that it is not possible to provide a specific selection of prescribeable links, and in so doing links that can be made according to prescribeable criteria. The reason can be considered to be, inter alia, that the current platforms store information without this information being attributed strictly prescribeable editing criteria and strictly prescribeable evaluation criteria.

Secondly, the known platform apparatuses have the disadvantage that the contents of dual units of individual subscribers are predominantly not accessible to suitable other subscribers, which means that synergistic collective editing of the contents of a large number of dual units is not possible.

SUMMARY OF THE INVENTION

It is therefore an object of the invention to provide a platform apparatus that allows use and/or editing of the contents of dual units of any individual subscriber by a plurality of suitable subscribers.

For a platform apparatus of the type cited at the outset, this object is achieved in that the content of at least one dual unit (DuU) (104) from a plurality of dual units (101 to 109) of a subscriber A is transmitted to a subscriber B in automated fashion by means of an active feed (DuU-feed) (140), and at the same time the content of at least one dual unit (DuU) (112, 113) from a plurality of dual units (111 to 121) of a subscriber B is transmitted to a subscriber A in automated fashion by means of an active feed (DuU-feed) (130), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A.

Preferred embodiments of the invention are the subject matter of the subclaims.

In the case of the inventive platform apparatus, the effect achieved by the combination of features that the content of at least one dual unit (DuU) (104) from a plurality of dual units (101 to 109) of a subscriber A is transmitted to a subscriber B in automated fashion by means of an active feed (DuU-feed) (140), and at the same time the content of at least one dual unit (DuU) (112, 113) from a plurality of dual units (111 to 121) of a subscriber B is transmitted to a subscriber A in automated fashion by means of an active feed (DuU-feed) (130), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A, is that automated active transmission of the contents of dual units of individual subscribers between suitable subscribers can be brought about when a predetermined initial criterion is provided, the initial criterion in the case of the present invention being the setup of a connection via an individual dual unit (DuU) of two subscribers. By way of example, this allows transmission of specific contents to extraneous subscribers who can be assumed to have an a priori interest in the transmitted contents by virtue of the criteria of prescribeable headword provision. This allows content marketing to be implemented.

It is an aim of the invention to provide a network architecture that actively fosters the communication between suitable subscribers by virtue of mutual active transmission (feed) of the contents of the respective dual units (DuUs) of two or more subscribers on a web-based information platform in order to allow active interchange of contents between suitable subscribers and furthermore also in order to render prescribed contents of the editing accessible to a plurality of subscribers, in a sense of contents being fed back subsequent to contents being sent.

Formation of dual units allows information concerning very specific editing guidelines to be edited, stored and, under prescribeable criteria, which can be defined in headwords or groups of headwords, automatically forwarded to other subscribers, with firstly distinction and classification of the information into different topics with associated editing criteria being possible and secondly specific criteria for automatic forwarding of new information also being prescribeable.

According to a first preferred embodiment of the inventive apparatus, the contents of a plurality of dual units (DuUs) of a subscriber A are transmitted to a subscriber B in automated fashion by means of an active feed (DuU-feed), and at the same time the contents of a plurality of dual units (DuUs) of a subscriber B are transmitted to a subscriber A in automated fashion by means of an active feed (DuU-feed), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A.

In this case, the quantity of the dual units (DuUs) of a subscriber A that are transmitted to a subscriber B in automated fashion by means of an active feed (DuU-feed) can preferably be prescribed by the subscriber A, and accordingly the quantity of the dual units (DuUs) of a subscriber B that are transmitted to a subscriber A in automated fashion by means of an active feed (DuU-feed) can preferably be prescribed by the subscriber B.

According to an alternative embodiment of the present invention, the contents of all the dual units (DuUs) of a subscriber A are transmitted to a subscriber B in automated fashion by means of an active feed (DuU-feed), and at the same time the contents of all the dual units (DuUs) of a subscriber B are transmitted to a subscriber A in automated fashion by means of an active feed (DuU-feed), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A.

As an alternative or in addition to the aforementioned criterion, a connection between subscriber A and subscriber B can be set up by virtue of subscriber A contacting subscriber B and possibly additionally also subscribers C, D and E via an individual dual unit (DuU) (104). Similarly, a connection between subscriber A and subscriber B can naturally also be set up by virtue of subscriber A contacting subscriber B via an individual dual unit (DuU). Alternatively, and probably occurring most frequently in reality, however, a connection between subscriber A and subscriber B will be set up by virtue of a third subscriber C contacting subscriber A and subscriber B by means of an individual dual unit (DuU).

According to an important preferred embodiment of the inventive apparatus, an information filter of a dual unit is designed to register information introduced by identified subscribers pertaining to a first content in the memory location and to store the identifiers associated with the identified subscribers in a memory unit in order to send a notification (DuU-feed) to the identifiers of the identified subscribers when a further piece of information pertaining to the first content in the memory location is input by a further identified subscriber having a different identifier than the identified subscribers.

According to another preferred embodiment of the inventive apparatus, the identifiers of the identified subscribers are suitable for forming predetermined subgroups of subscribers in order to provide subscriber filters that use the identifiers, in order to send merely specified notifications (DuU-feeds) to subscribers in one or more predetermined subgroups.

Criteria that may be provided for the formation of subgroups of subscribers are properties and characteristics of the individual subscribers, such as age, sex, web activities, regional origin, etc. Entirely different criteria are also conceivable, however.

Preferably, but not necessarily, a notification contains the content of the further information introduced by a further subscriber.

According to a further preferred embodiment of the inventive apparatus, a notification (DuU-feed) is sent to the identifier of an identified subscriber by means of a transmission device activated by the input of the further information pertaining to the first content for the purpose of providing an information link.

According to an important preferred embodiment of the inventive apparatus, an information filter is designed to send a notification (DuU-feed) to the identifier of the identified subscriber when a piece of information pertaining to a second content, which is different than the first content in a predefined manner, in the memory location is input by a further subscriber having a different identifier than the identified subscribers.

The notification preferably contains the content of the information that is introduced by the further subscriber pertaining to the second topic.

According to a preferred concept of the invention, a notification (DuU-feed) is sent to the identifier of the identified subscribers by means of a transmission device activated by the input of the information pertaining to the second content for the purpose of providing an information link.

Preferably, for each subscriber it is possible to set up access to the dual units in order to allow any subscriber to edit any content in light of the information filter associated with the content.

Furthermore, according to a preferred embodiment of the invention, a dual unit can be split to form two or more dual units by one of the subscribers by allocating at least one further information filter to a first topic. A dual unit may also be able to be split by one of the subscribers to form two or more dual units by allocating at least one further topic to a first information filter.

Preferably, any of the subscribers is capable of initial placement of a dual unit.

According to a further important preferred embodiment of the present invention, an identifier for a subscriber A, B . . . is formed by the plurality of dual units that is associated with the relevant subscriber A, B . . . .

BRIEF DESCRIPTION OF THE DRAWINGS

The inventive apparatus is explained below using a preferred embodiment that is shown in the figures of the drawing, in which.

DETAILED DESCRIPTION

Figure 1:
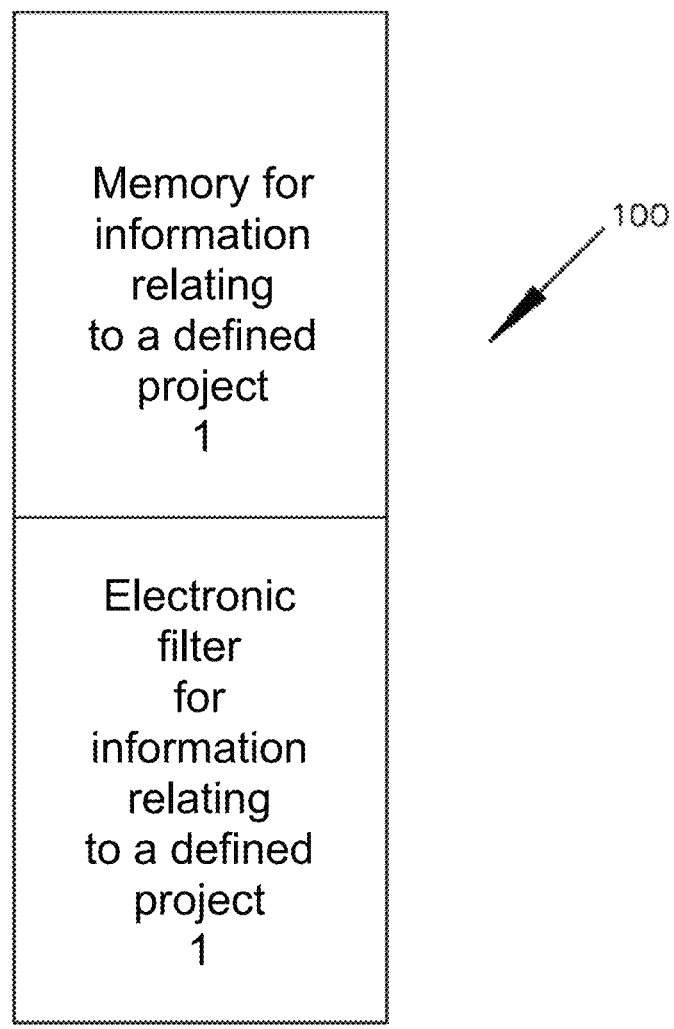
FIG. 1 shows a basic embodiment of a dual unit (DuU) according to a preferred embodiment of the invention in the form of a block diagram.
Figure 2:
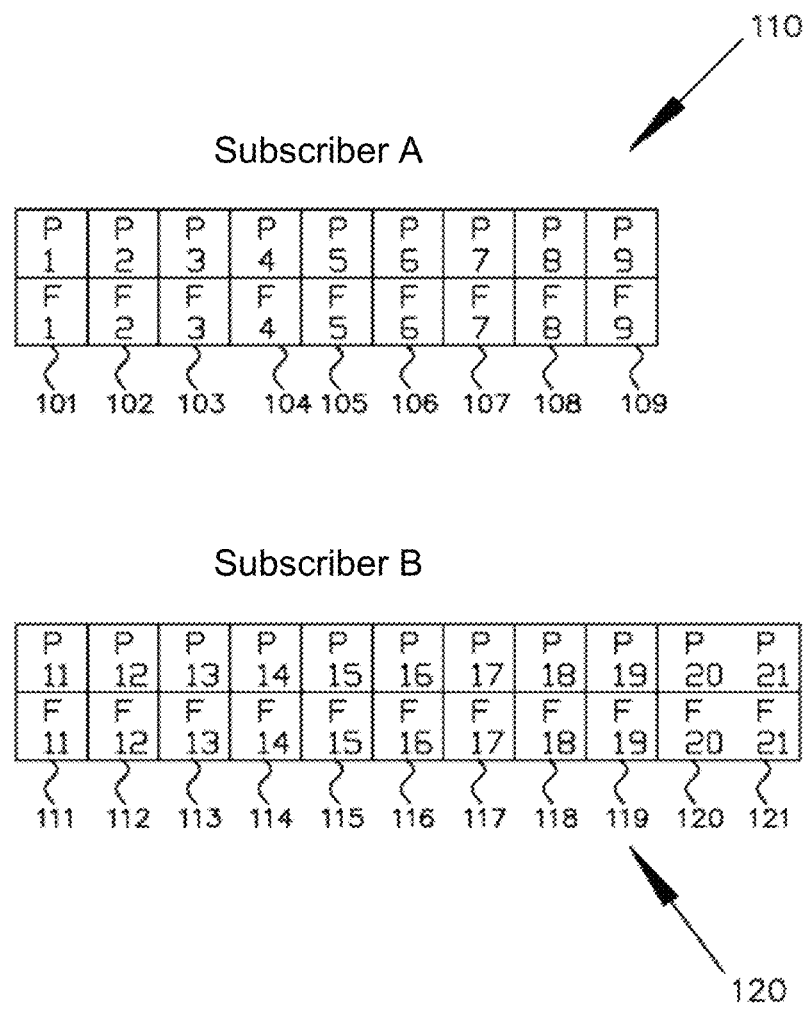
FIG. 2 shows a plurality of dual units (DuUs) with an embodiment as shown in FIG. 1, associated with a subscriber A, and also a plurality of dual units (DuUs) with an embodiment as shown in FIG. 1, associated with a subscriber B.
Figure 3:
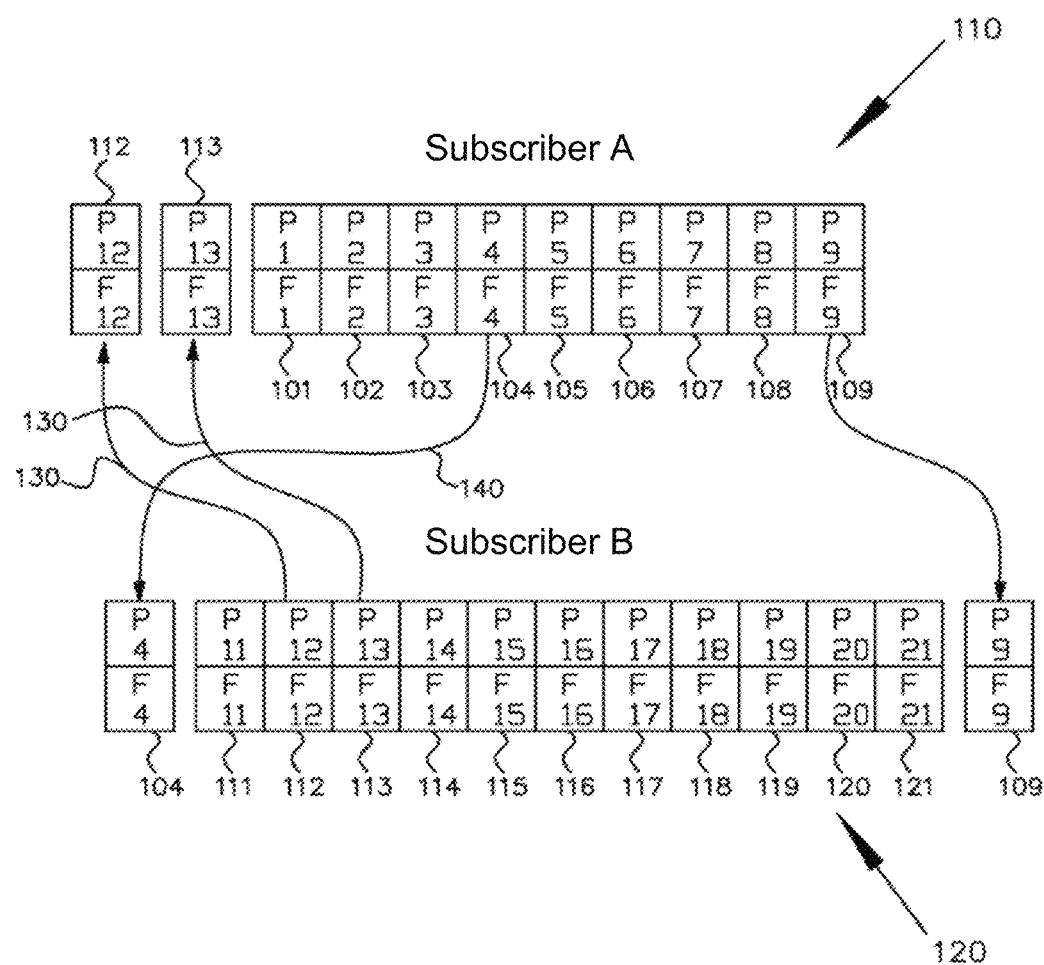
FIG. 3 shows input of dual units (DuUs) of the subscriber A into the plurality of dual units (DuUs) of the subscriber B by DuU-feed and also input of dual units (DuUs) of a subscriber B into the plurality of dual units (DuUs) of the subscriber B by DuU feed, initiated by a singular DuU feed from subscriber A to subscriber B.

The inventive web-based platform apparatus for collecting and editing information that is shown in FIGS. 1 to 3 can be networked to a plurality of subscribers A, B that can be identified by means of an identifier, wherein the information on the platform is formed by a plurality of dual units. The subscribers A, B are shown merely by way of example. The number of subscribers is more or less unlimited according to the capacity of the worldwide Internet.

As FIG. 1 shows, a dual unit in this case respectively comprises a memory location, which is associated with a prescribeable content and is provided with an identifier, and also a prescribeable criterion, which is associated with the memory location and is in the form of an information filter, for input of a piece of information into the memory location.

As soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A, firstly the content of the dual units (DuUs) 104 from the plurality of dual units 101 to 109 of the subscriber A is transmitted to the subscriber B in automated fashion by means of an active feed (DuU-feed) 140, and secondly the content of the dual units (DuUs) 112, 113 from the plurality of dual units 111 to 121 of the subscriber B is transmitted to the subscriber A in automated fashion by means of an active feed (DuU-feed) 130.

The connection between subscriber A and subscriber B can alternatively be set up by virtue of subscriber A having contacted the subscriber B via an individual dual unit (DuU) 104.

In this case, a corresponding information filter of a dual unit 101 to 109; 111 to 121 is designed to register information introduced by identified subscribers A, B (and generally also by a plurality of further subscribers) pertaining to a first content in the memory location and to store the identifiers associated with the identified subscribers in a memory unit in order to send a notification (DuU-feed) to the identifiers of the identified subscribers when a further piece of information pertaining to the first content in the memory location is input by a further identified subscriber having a different identifier than the identified subscribers.

The identifiers of the identified subscribers are suitable for forming predetermined subgroups of subscribers in order to provide subscriber filters that use the identifiers, in order to send merely specified notifications (DuU-feeds) to subscribers in one or more predetermined subgroups.

The criteria provided for the formation of subgroups of subscribers are personal properties and characteristics such as age, sex, web activities, regional origin, etc., of the individual subscribers.

A notification contains the content of the further information introduced by a further subscriber, wherein a notification (DuU-feed) is sent to the identifier of an identified subscriber by means of a transmission device activated by the input of the further information pertaining to the first content for the purpose of providing an information link.

An information filter is designed to send a notification (DuU-feed) to the identifier of the identified subscriber when a piece of information pertaining to a second content, which is different than the first content in a predefined manner, in the memory location is input by a further subscriber having a different identifier than the identified subscribers. In this case, the notification contains the content of the information introduced by the further subscriber pertaining to the second topic.

A notification (DuU-feed) is sent to the identifier of the identified subscribers by means of a transmission device activated by the input of the information pertaining to the second content for the purpose of providing an information link.

For each subscriber it is possible to set up access to the dual units in order to allow any subscriber to edit any content in light of the information filter associated with the content. In this case, a dual unit can be split to form two or more dual units by one of the subscribers by virtue of at least one further information filter being allocated to a first content.

Furthermore, a dual unit can be split by one of the subscribers to form two or more dual units by virtue of at least one further topic being allocated to a first information filter. However, any of the subscribers is capable of initial placement of a dual unit.

The exemplary embodiment of the invention that has been explained above is used merely for the purpose of better comprehension of the inventive teaching described by the claims, which, as such, is not restricted by the exemplary embodiment.

What is claimed is:

1. A web-based platform apparatus for collecting and editing information, which platform apparatus can be networked to a plurality of subscribers that can be identified by means of an identifier, wherein the information on the platform is formed by a plurality of dual units (DuUs), wherein a dual unit (DuU) respectively comprises a memory location, associated with a prescribeable content and provided with an identifier, and also a prescribeable criterion, associated with the memory location and in the form of an information filter, for input of a piece of information into the memory location, wherein the content of at least one dual unit (DuU) (104) from a plurality of dual units (101 to 109) of a subscriber A is transmitted to a subscriber B in automated fashion by means of an active feed (DuU-feed) (140), and at the same time the content of at least one dual unit (DuU) (112, 113) from a plurality of dual units (111 to 121) of a subscriber B is transmitted to a subscriber A in automated fashion by means of an active feed (DuU-feed) (130), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A, characterized in that the contents of a plurality (101 to 105) of dual units (DuUs) of a subscriber A are transmitted to a subscriber B in automated fashion by means of an active feed (DuU-feed), and at the same time the contents of a plurality of dual units (DuUs) (111 to 116) of a subscriber B are transmitted to a subscriber A in automated fashion by means of an active feed (DuU-feed), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A, and the identifiers of the identified subscribers are suitable for forming predetermined subgroups of subscribers in order to provide subscriber filters that use the identifiers, in order to send merely specified notifications (DuU-feeds) to subscribers in one or more predetermined subgroups.

2. The apparatus as claimed in claim 1, characterized in that the quantity of the dual units (DuUs) (101 to 105) of a subscriber A that are transmitted to a subscriber B in automated fashion by means of an active feed (DuU-feed) can be prescribed by the subscriber A, and the quantity of the dual units (DuUs) (111 to 116) of a subscriber B that are transmitted to a subscriber A in automated fashion by means of an active feed (DuU-feed) can be prescribed by the subscriber B.

3. The apparatus as claimed in claim 1, characterized in that the contents of all the dual units (DuUs) (101 to 109) of a subscriber A are transmitted to a subscriber B in automated fashion by means of an active feed (DuU-feed), and at the same time the contents of all the dual units (DuUs) (111 to 121) of a subscriber B are transmitted to a subscriber A in automated fashion by means of an active feed (DuU-feed), as soon as a search engine, which is oriented to headwords or groups of headwords and is designed as an electronic filter, on the Internet finds prescribeable headwords or prescribeable groups of headwords that are part of the content of a dual unit of a subscriber B in a memory location of a subscriber A.

4. The apparatus as claimed in claim 1, characterized in that a connection between subscriber A and subscriber B is set up by virtue of subscriber A contacting subscriber B via an individual dual unit (DuU) (104).

5. The apparatus as claimed in claim 1, characterized in that a connection between subscriber A and subscriber B is set up by virtue of subscriber A contacting subscriber B via an individual dual unit (DuU).

6. The apparatus as claimed in claim 1, characterized in that a connection between subscriber A and subscriber B is set up by virtue of a third subscriber C contacting subscriber A and subscriber B by means of an individual dual unit (DuU).

7. The apparatus as claimed in claim 1, characterized in that an information filter of a dual unit (101 to 109; 111 to 121) is designed to register information introduced by identified subscribers pertaining to a first content in the memory location and to store an identifier associated with the identified subscribers in a memory unit in order to send a notification (DuU-feed) to the identifiers of the identified subscribers when a further piece of information pertaining to the first content in the memory location is input by a further identified subscriber having a different identifier than the identified subscribers.

8. The apparatus as claimed in claim 7, characterized in that the criteria provided for the formation of subgroups of subscribers are age, sex, web activities, regional origin, etc., of the individual subscribers.

9. The apparatus as claimed in claim 7, characterized in that a notification contains the content of the further information introduced by a further subscriber.

10. The apparatus as claimed in claim 7, characterized in that a notification (DuU-feed) is sent to the identifier of an identified subscriber by means of a transmission device activated by the input of the further information pertaining to the first content for the purpose of providing an information link.

11. The apparatus as claimed in claim 1, characterized in that an information filter is designed to send a notification (DuU-feed) to the identifier of the identified subscriber when a piece of information pertaining to a second content, which is different than the first content in a predefined manner, in the memory location is input by a further subscriber having a different identifier than the identified subscribers.

12. The apparatus as claimed in claim 11, characterized in that the notification contains the content of the information that is introduced by the further subscriber pertaining to the second content.

13. The apparatus as claimed in claim 11, characterized in that a notification (DuU-feed) is sent to the identifier of the identified subscribers by means of a transmission device activated by the input of the information pertaining to the second content for the purpose of providing an information link.

14. The apparatus as claimed in claim 1, characterized in that for each subscriber it is possible to set up access to the dual units in order to allow any subscriber to edit any content in light of the information filter associated with the content.

15. The apparatus as claimed in claim 14, characterized in that a dual unit can be split to form two or more dual units by one of the subscribers by allocating at least one further information filter to a first topic.

16. The apparatus as claimed in claim 14, characterized in that a dual unit can be split by one of the subscribers to form two or more dual units by allocating at least one further topic to a first information filter.

17. The apparatus as claimed in claim 1, characterized in that any of the subscribers is capable of initial placement of a dual unit.

18. The apparatus as claimed in claim 1, characterized in that an identifier for a subscriber A, B . . . is formed by the plurality of dual units that is associated with the relevant subscriber A, B . . . .

\* \* \* \* \*